United States Patent [19]  [11] 3,942,903
Dickey et al.  [45] Mar. 9, 1976

[54] UNITARY POROUS THEMOPLASTIC WRITING NIB

[75] Inventors: Clarence A. Dickey, Atlanta; John E. McDaniel, Fairburn, both of Ga.

[73] Assignee: Glasrock Products, Inc., Atlanta, Ga.

[22] Filed: Apr. 23, 1974

[21] Appl. No.: 463,308

Related U.S. Application Data

[62] Division of Ser. No. 336,179, Feb. 27, 1973, Pat. No. 3,896,196.

[52] U.S. Cl. ............... 401/198; 428/306; 428/402; 428/421; 260/2.5 B; 401/215
[51] Int. Cl.$^2$ ..... B43K 5/00; C08J 9/00; B32B 5/18
[58] Field of Search ........ 264/5, 6, 13, 15; 161/271; 401/198; 428/306, 402, 421; 260/2.5 B

[56] References Cited
UNITED STATES PATENTS

| | | | |
|---|---|---|---|
| 3,022,542 | 2/1962 | Davis | 401/198 |
| 3,397,938 | 8/1968 | Juelss | 401/198 |
| 3,540,914 | 11/1970 | Lin | 428/306 X |
| 3,558,392 | 1/1971 | Goodenow et al. | 401/198 X |
| 3,558,582 | 1/1971 | Bacskai | 161/189 X |

Primary Examiner—Harold Ansher
Assistant Examiner—Patricia C. Ives
Attorney, Agent, or Firm—Lane, Aitken, Dunner & Ziems

[57] ABSTRACT

A process is provided to form spherical thermoplastic particles that involves dispersing a thermoplastic powder in a liquid that is a partial solvent for the thermoplastic, breaking the dispersion into droplets, forming thermoplastic spheres by heating the droplets to a temperature sufficient to at least partially solubilize the thermoplastic and to evaporate the solvent. Unique products, including porous structures, may be produced from material formed by this process.

4 Claims, 4 Drawing Figures

3,942,903

UNITARY POROUS THEMOPLASTIC WRITING NIB

This is a division of application Ser. No. 336,179, filed Feb. 27, 1973, now U.S. Pat. No. 3,896,196.

BACKGROUND OF THE INVENTION

The present invention relates to an improved method of producing thermoplastic particles, particularly suitable for use as a writing nib, and to a process for the production of a material from such particles.

Porous plastic structures, including writing nibs, are commonly manufactured by sintering together granular particles of a thermoplastic material. "Kynar", a trade name of Pennwalt Corporation, is commonly used as a thermoplastic material of such structures. One prior art process involves chopping and grinding the "Kynar" material by means of a pulverizer to produce granular particles. It is believed that the maximum density can be approached only where such granular particles are spherical in shape. However, the granular material of the prior art process is composed of particles that are irregularly shaped or porous and therefore maximum density within a mold is not possible.

In the sintering step, the particles tend to change toward a shape having a minimum surface area (spherical) which inherent tendency causes the entire mass to shrink. This phenomenon results in irregularly shaped products. Another problem associated with this prior art process stems from the fact that the individual particles themselves are porous. The sintering step also tends to reduce the porosity of the particles, further contributing to the shrinkage problem.

Yet another problem associated with such prior art processes is the inability to control the pore sizes of the finished product due to its construction from irregularly shaped particles. It is desirable to control pore size in order to provide a controlled flow when the product is used for gas or liquid flow control or fluid transfer. If the pourous material is to be used as a filter, it is also desirable to control the pore size.

SUMMARY OF THE INVENTION

It has now been discovered that the above indicated problems can be overcome successfully by forming writing nibs and other porous thermoplastic products from fine, dense, spherical, thermoplastic particles provided by the process of the present invention. These particles, which are generally spherical in shape, are nearly uniform in size. They are obtained by dispersing a thermoplastic powder in a liquid that acts as a partial solvent for the thermoplastic and breaking the dispersion into droplets by atomization or by a similar technique. The atomized droplets are heated to a temperature sufficient to at least partially solubilize the thermoplastic and to evaporate the solvent, which heating and atomizing allows the thermoplastic to assume a generally spherical shape. These small thermoplastic spheres are then sintered, possibly within a mold, to form porous writing nibs or other porous products. The writing nibs so produced have dramatically improved strength attributable to their unique structure, composed of nearly perfect spheres.

Accordingly, it is an object of the present invention to provide dense thermoplastic spheres of uniform size suitable for molding into a porous product.

It is a further object of the present invention to provide a porous thermoplastic product of uniform pore size.

Another object of the present invention to provide an improved writing nib.

Yet another object and advantage is the use of the material of the present invention as a molding powder raw material for fluid bed coating and other coating operations, rotational molding, injection molding or extrusion.

Other objects and advantages of the present invention will become apparent from the detailed description to follow taken in conjunction with the drawings and appended claims.

DESCRIPTION OF THE PREFERRED EMBODIMENTS

Figure 1:
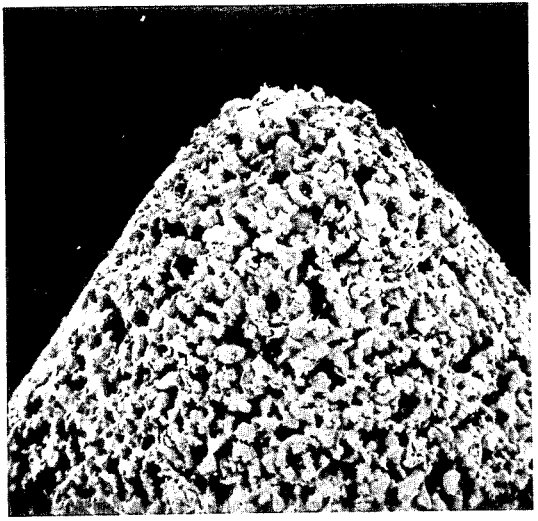
FIG. 1 is a photograph (52X) of the microstructure of a prior art porous thermoplastic writing nib.
Figure 2:
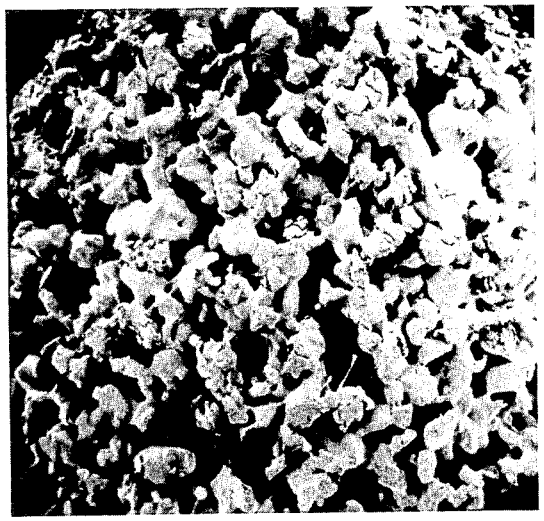
FIG. 2 is a photograph (120X) showing a section of the prior art writing nib of FIG. 1 under a higher degree of magnification.
Figure 3:
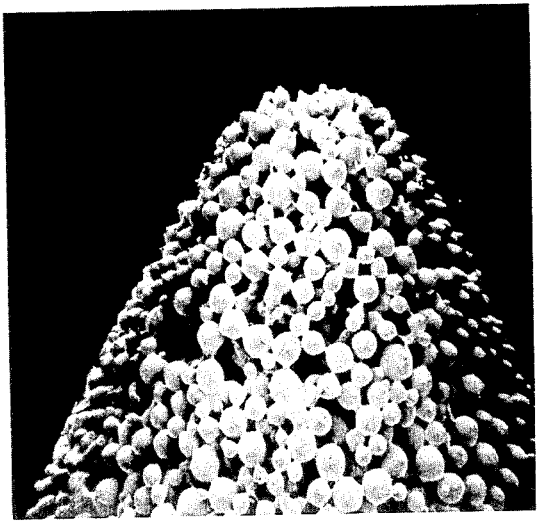
FIG. 3 is a photograph (44X) of the microstructure of a writing nib manufactured according to the present invention.
Figure 4:
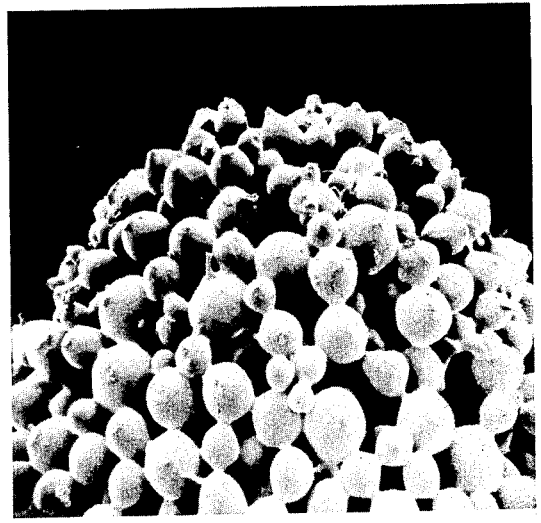
FIG. 4 is a photograph (87X) of an enlarged section of the writing nib of FIG. 3.

As previously noted, the present invention is directed to an improved process for producing spherical thermoplastic particles and to products made therefrom. It has been discovered that porous thermoplastic products having superior properties can be manufactured from dense spherically shaped particles formed by a process involving the dispersion of a thermoplastic powder in a liquid that acts as a partial solvent for the thermoplastic.

The thermoplastic used in the present invention may be polyvinylidene fluoride, polyethylene or any equivalent thermoplastic. The presently preferred material is "Kynar", the trade name of Pennwalt Corporation for an ultra-fine polyvinylidene fluoride powder (less than 10 microns). However, almost any thermoplastic powder of the proper particle size can be processed in the manner of the present invention, the only requirement being to select a liquid which operates as a partial solvent therefor at the atomization temperature.

The presently preferred partial solvent for the polyvinylidene fluoride is methyl isobutyl ketone (hereinafter referred to as MIBK). Polyvinylidene fluoride is only slightly soluble in MIBK at room temperature, but goes into solution at temperatures of about 140° F and above. Other potential partial solvents include methyl ethyl ketone, dimethyl sulfoxide and dimethyl formamide.

The thermoplastic powder is dispersed in the liquid partial solvent by any conventional means, to form a stable suspension at room temperature. The partial solvent acts to partially dissolve or soften the particle surfaces rendering them able to adhere to each other on contact.

In forming the suspension or dispersion, the ratio of powder to liquid can be varied over almost an infinite range. However, this ratio will affect the final particle size. The smaller the ratio of powder to liquid, the smaller the solid spherical particles that are produced (all other conditions remaining constant). Higher ratios of powder to liquid will, in turn, produce larger spherical particles. The ratio of thermoplastic powder to partial solvent chosen will also depend, in part, on the particular thermoplastic and solvent used. In the case of polyvinylidene fluoride and methyl isobutyl ketone, the operable range is from about 5% by weight powder to about 65% by weight powder. The presently preferred ratio for the PVF MIBK system is 20% to 30% by weight powder. Even very thick slurries can be handled and spray-dried according to the present invention using a "paste system."

In the spray-drying or atomizing step, the powder-liquid dispersion is broken into numerous droplets using a conventional spray-drying apparatus. Atomization by means of a spray nozzle is the presently preferred method of reducing the dispersion to droplets because it affords some degree of control over the droplet size. In such an apparatus, the droplet size may be varied by changing the line pressure at the nozzle or by changing the nozzle itself, i.e., the size of the openings through which the liquid is ejected. Alternately, ultrasonics or any other known method may be used to reduce the dispersion to droplet form.

The atmosphere into which the droplets are ejected is maintained at a temperature sufficient to at least partially solubilize the thermoplastic and to evaporate the partial solvent. The presently preferred temperature approximates the melting point of the particular thermoplastic used, e.g., 340°F for $PVF_2$. In the case of $PVF_2$, the spray-drying step may be conducted at temperatures ranging from about 200° to 600°F (or the boiling point of the particular solvent used), and is preferably conducted within the range of 340°F to 390°F. The preferred 390°F maximum temperature is based on the dryer size, residence time, etc, associated with the particular apparatus used in a series of actual tests. Above that temperature, the particles tended to stick together prematurely. The operating temperature for the spray-drying step should be selected in accordance with the equipment size, the residence time, the through-put, production rate, etc.

The droplets assume a spherical shape due to the surface tension of the liquid. The surfaces of the particles within the liquid are tacky due to the solvent action of the liquid and, therefore, as the solvent is evaporated, the particles tend to stick together in a spherical configuration. As the temperature of the particles increases to the melting point of the thermoplastic, the agglomorated particles within the sphere melt and flow together to form a smooth surfaced densified sphere.

Thermoplastic spheres have been produced experimentally by the method described above having sizes varying from less than 37 microns to around 200 microns. Each sphere is formed from a given amount of ultra-fine powder, which amount will vary according to the size of the droplets formed in the atomization step. The spheres produced according to the method described above may be dense throughout or may contain a small hollow space in the center. A minority of the spheres obtained experimentally have been found to have a concave portion indicating either that a hollow sphere imploded or that the particle exploded and the edge surfaces where subsequently smoothed by the heat in the dryer.

The spheres obtained in the manner described above are then sintered and molded to the shape of the desired article using conventional molding apparatus. The molding and sintering step requires a temperature which is at least approaching the melting point of the thermoplastic. $PVF_2$ spheres may be molded at any temperature within the range of from 300°F to 600°F by varying the residence time. When cool enough for handling, the article may be removed from the mold. Of course a mold is not the only means for shaping an article. The spheres may be formed into a sheet, for example, and the sheet material may be cut, ground, or otherwise shaped.

Because of their spherical shape and dense nature, the thermoplastic spheres produced in accordance with the present invention lend themselves to a relatively simplified packing, filling or spreading operation. The mere vibrating or slight shaking of the receiver is sufficient to achieve the required degree of packing. This feature makes automation of such operations feasible.

Writing nibs composed of the porous thermoplastic product of the present invention are superior to the prior art nibs with respect to strength, writing ability, useful life, dimension tolerances, and uniformity of pore size and ink flow characteristics. A strong writing nib is particularly desirable when used to make carbon copies.

The present invention is illustrated in more detail by the following description of actual working examples:

EXAMPLE 1

This test was performed using a 10 foot diameter, 30 foot high spray dryer. The inlet temperature to the dryer was maintained within the range of 350°F to 355°F with the outlet temperature remaining constant of approximately 240°F. The feed was a slurry containing approximately 30% by weight $PVF_2$ and approximately 70% by weight MIBK. The feed rate was 37 gallons per hour and the atomizing pressure was approximately 500 psig. The test produced spherical particles suitable for molding into porous structures. It was estimated that less than 2% of the particles so produced were not fully densified. The particle size distribution for the product was as follows:

Approximately 13% greater than 105 microns.
Approximately 46% less than 105 microns.
Approximately 41% less than 74 microns

EXAMPLE 2

This experiment was also performed in a 10 foot diameter, 30 foot high, spray dryer. The inlet temperature was controlled at 345°F with the outlet temperature remaining constant at approximately 240°F. The feed was the same as that used in Example 1, a slurry containing approximately a 30% by weight $PVF_2$ and approximately 70% by weight MIBK. The feed rate in this experiment was 25 gallons per hour at an atomizing pressure of 150 psig. This experiment also succeeded in producing dense spherical particles suitable for molding into porous structures. It was estimated that less than 5% of these particles were not fully densified. The particle size distribution for the product was as follows:

Approximately 66.5% greater than 105 microns.
Approximately 25% less than 105 microns, greater than 74 microns.
Approximately 8.5% less than 74 microns.

EXAMPLE 3

This experiment was conducted using a 4 foot 6 inch diameter, 12 foot high spray dryer. The inlet temperature was maintained at approximately 310°F with an outlet temperature remaining at approximately 250°F.

The feed was a slurry containing approximately 35% by weight FVF$_2$ and approximately 65% by weight MIBK. The feed rate was 19 gallons per hour at an atomizing pressure of 150 psig. The particles so produced were spherical but were not as dense as in the two previous examples. They were milky white in appearance and were hollow. Further densification was necessary before a high quality molded porous structure could be produced from these particles. The particular size distribution for the particles obtained in this test was as follows:

Approximately 77.5% greater than 105 microns.
Approximately 12.8% less than 105 microns, greater than 74 microns
Approximately 9.8% less than 74 microns.

EXAMPLE 4

This test was to examine the stiffness of nibs produced from material which was prepared in accordance with the present invention because it has been found that stiffness is a good indicator of the strength of nibs and the ability of nibs to hold a point during use. The PVF$_2$ material was prepared as in the prior art and then in accordance with the present invention. Nibs were produced from both materials. A Tinius Olsen Stiffness Tester (one inch-pounds capacity) was used to obtain the following information (the smaller the number, the stronger the nib);

| Material | Stiffness Reading | Range | Average |
|---|---|---|---|
| Prior Art | 25, 24, 27, 20, 26, 24, 25, 25, 27, 21, 23, 26, 19, 28, 21, 23, 26, 23, 25, 22 | 9 | 24 |
| Present Invention | 10, 10, 12, 11, 9, 9, 10, 10, 10, 9, 8, 10, 10, 10, 12, 10, 10, 9, 11, 10 | 4 | 10 |

As can readily be seen from the above data, an increase in strength of about 57% is obtained using material prepared in accordance with the present invention.

The invention may be embodied in other specific forms without departing from the spirit or essential characteristics thereof. The above examples therefore are to be considered in all respects as illustrative and not restrictive, the scope of the invention being indicated by the appended claims, and all changes which come within the meaning and range of equivalency of the claims are intended to be embraced therein.

We claim:
1. A unitary porous thermoplastic polymer product formed by:
   dispersing thermoplastic polymer particles in a partial solvent for said thermoplastic polymer;
   atomizing the dispersion at an elevated temperature sufficient to at least partially solubilize said thermoplastic polymer, to vaporize said partial solvent and to cause said particles to adhere and melt together thus forming fully-densified microspheres of the thermoplastic polymer; and
   sintering said thermoplastic polymer microspheres to form the porous product.
2. A unitary porous product of claim 1 formed of a plurality of fully-densified polyvinylidene fluoride microspheres sintered together.
3. A writing nib formed from the product of claim 2.
4. A writing nib formed from the product of claim 1.

* * * * *

UNITED STATES PATENT OFFICE
CERTIFICATE OF CORRECTION

Patent No. 3,942,903      Dated March 9, 1976

Inventor(s) Clarence A. Dickey and John E. McDaniel

It is certified that error appears in the above-identified patent and that said Letters Patent are hereby corrected as shown below:

In the title, "THEMOPLASTIC" should read --THERMOPLASTIC--.

Column 1, line 41, "pourous" should read --porous--.

Column 4, line 68, "250°F" should read --230°F--.

Column 5, line 2, "$FVF_2$" should read --$PVF_2$--.

*Signed and Sealed this*

Twentieth *Day of* July 1976

[SEAL]

Attest:

RUTH C. MASON
*Attesting Officer*

C. MARSHALL DANN
*Commissioner of Patents and Trademarks*